(12) United States Patent
Piazza

(10) Patent No.: US 7,644,917 B2
(45) Date of Patent: Jan. 12, 2010

(54) APPARATUS FOR HANDLING SHEET PRODUCTS WITH GRIP ASSEMBLY ON RAILS

(76) Inventor: Antonio Piazza, Via Frate Matteo, 24, 36015 Schio (IT)

( * ) Notice: Subject to any disclaimer, the term of this patent is extended or adjusted under 35 U.S.C. 154(b) by 70 days.

(21) Appl. No.: 11/905,426

(22) Filed: Oct. 1, 2007

(65) Prior Publication Data
US 2008/0079217 A1 Apr. 3, 2008

(30) Foreign Application Priority Data
Oct. 3, 2006 (IT) .......................... PD2006A0363

(51) Int. Cl.
*B65H 29/00* (2006.01)
(52) U.S. Cl. ........................ 271/186; 271/264; 271/194; 271/185
(58) Field of Classification Search ................. 271/264, 271/184, 185, 186, 194; 414/783; 29/17.1
See application file for complete search history.

(56) References Cited

U.S. PATENT DOCUMENTS

2006/0196376 A1* 9/2006 Piazza ........................ 101/477

* cited by examiner

*Primary Examiner*—Patrick H MacKey
*Assistant Examiner*—Gerald W McClain
(74) *Attorney, Agent, or Firm*—Modiano & Associati; Albert Josif; Daniel J. O'Byrne

(57) ABSTRACT

An apparatus for handling sheet-like products having: a truck glidable on rails, a supporting structure for an assembly for gripping a sheet, the supporting structure performing a translational motion on the truck through a lateral translational motion with respect to the direction of advancement of the truck, a grip assembly for a sheet, which is rotatably coupled to the supporting structure by way of rotation elements adapted to move it from a first raised grip configuration to a second substantially horizontal configuration, and a worktable arranged above the rails and provided with through openings that can be crossed downward from above by the grip assembly during the rotary motion from the first raised configuration to the second substantially horizontal configuration.

23 Claims, 4 Drawing Sheets

APPARATUS FOR HANDLING SHEET PRODUCTS WITH GRIP ASSEMBLY ON RAILS

The present invention relates to an apparatus for handling sheet-like products accommodated in a storage facility.

The invention is applied in particular with sheet-like products such as large glass sheets and the like accommodated in storage facility particularly but not exclusively of the type with inclined frames and perpendicular translational motion.

BACKGROUND OF THE INVENTION

Various machines and pieces of equipment or handling lines are currently known for conveying sheet-like products, such as glass sheets and the like, from a storage facility, for example of the type with perpendicular translational motion, to a region for easy handling or working and vice versa.

These storage facilities used in storing glass sheets generally have a plurality of inclined frames which are arranged in a row and are parallel and arranged in a storage area.

Apparatuses for picking up and loading sheet-like products, arranged so as to travel on rails to the side of a row, or between two rows, of inclined sheet supporting frames are currently known for the handling of said sheets.

Such an apparatus, disclosed and claimed in Italian patent 0001280055 of 3 Feb. 1995 in the name of this same Applicant, is characterized in that it comprises:

a truck which can glide on one or more rails, a supporting structure for a grip assembly, of the type with suckers, for a sheet, said supporting structure being able to perform a translational motion on the truck by way of means for lateral translational motion with respect to the advancement direction of the truck, a grip assembly for a sheet, which is rotatably coupled to its supporting structure by way of rotation means which are adapted to arrange it from a first raised grip configuration to a second substantially horizontal configuration and vice versa, both on one side, for example forward, and on the opposite side, i.e., backward.

Said grip assembly, after picking up a sheet from an inclined frame, deposits it horizontally on a bed with motorized rollers which is designed for the translational motion of the sheet on a worktable, generally a cutting table.

The roller bed is substantially structured like a comb, with through openings which are contoured so that they can be crossed downward from above and vice versa by the grip assembly during its rotary motion from the first raised configuration to the second substantially horizontal configuration, when the truck is in a preset position proximate to the bed.

The grip assembly, formed by a series of uprights which are fixed in a lower region to a horizontal tubular element which belongs to the rotation means, turns toward the bed so as to support above itself the sheet retained by the suckers; as the uprights of the grip assembly rotate and descend so as to pass through the openings of the bed, the arrangement of the sheet tends to become coplanar with respect to the roller bed on which it is to be placed.

When the uprights of the grip assembly are in the openings of the roller bed or slightly below said bed, the suckers release the sheet, which rests on the bed.

Once the sheet has been placed completely on the roller conveyance bed, the rollers, by rotating, transfer it to a cutting table, while the grip assembly is available for a subsequent grip operation.

The case is also known in which the transfer of a sheet to a cutting table by a grip assembly mounted on a truck, which is normally of the overhead type, is performed by an associated roller bed for supporting the sheet-like products, again of the type which can be moved on a rail independently of the truck, the bed being provided with tilting means whose purpose is to move the bed from a first substantially horizontal configuration for gliding on rails to a second inclined configuration which is substantially parallel to the sucker-fitted grip assembly.

The operation of the apparatus is simple: the truck is moved until it arrives at the inclined sheet supporting frame, where the sheet-like product to be picked up is stored.

At this point, the means for the lateral translational motion of the grip assembly are actuated so as to produce the translational motion of the sucker-fitted grip assembly until it is arranged in front of the sheet to be picked up.

The sucker assembly is tilted by the angle needed to keep it parallel to the sheet to be picked up and then the suckers are actuated so that they adhere to the sheet.

The grip assembly with the sheet, which in this embodiment is unable to rotate until it is arranged horizontally, then returns to the central position in order to release the sheet onto the roller bed, which is raised so as to face the sheet in order to receive it.

At this point, the bed is lowered, returning the sheet to the horizontal position; here the sheet can be worked, if means for cutting or means for other kinds of work are associated with the bed, or can be handled easily by means of the support and gliding rollers.

The bed or worktable which can be lifted eliminate the risk of the sheet falling in case of a malfunction of the sucker system, but equipment which comprises them, while being widespread and widely appreciated commercially due to their excellent reliability and practicality, has limitations.

For storage facilities, glassworks and other similar storage areas of small size, the conveyance bed, be it of the comb or liftable type, in fact causes a substantial space occupation and requires a portion of the rails at the end of the stroke to be specifically provided for its temporary parking in order to allow said bed to not hinder the movement of the truck which supports the grip assembly and allow said truck to perform a translational motion at all of said inclined frames that form the magazine.

Further, the manufacture and setup of a roller bed, both of the comb type with through openings for the grip assembly and of the liftable type, is a substantial cost in the overall economy of the apparatus, both in terms of material and in terms of labor for producing it and assembling it.

Moreover, the rise of the bed or table so as to receive the sheet and the subsequent descent for the transfer of the sheet to a workstation, or for sending to working in the case of the table, require a certain time; this time interval keeps the grip assembly busy and said assembly is no longer available in such situations for a subsequent movement for a new grip operation, at least in the rising action.

SUMMARY OF THE INVENTION

The aim of the present invention is to provide an apparatus for handling sheet-like products which is capable of obviating the limitations revealed by known types of apparatus.

Within this aim, an object of the present invention is to provide an apparatus which is structurally simpler and therefore cheaper both in terms of materials and in terms of labor for assembly and installation with respect to known types of equipment and machinery.

Another object of the present invention is to provide an apparatus which is less bulky and can also be installed in small storage facilities and glassworks.

Another object of the present invention is to provide an apparatus which is capable of faster transfer of the sheet picked up by the grip assembly toward a working station, so as to allow the grip assembly to be available for a new grip operation in a shorter time than allowed by known types of apparatus.

Another object of the present invention is to provide an apparatus which can be associated easily with known types of storage facilities with flat frames, and with lines for working sheet-like products which are already known and in use.

Another object of the present invention is to provide an apparatus which is at least as safe as known apparatuses.

Another object of the present invention is to provide an apparatus for handling sheet-like products accommodated in a storage facility which can be manufactured cheaply with known systems and technologies.

This aim and these and other objects, which will become better apparent hereinafter, are achieved by an apparatus for handling sheet-like products, characterized in that it comprises:

- a truck which can glide on rails,
- a supporting structure for an assembly for gripping a sheet, said supporting structure being able to perform a translational motion on said truck by virtue of means for lateral translational motion with respect to the direction of advancement of the truck,
- a grip assembly for a sheet, which is rotatably coupled to its supporting structure by way of rotation means which are adapted to move it from a first raised grip configuration to a second substantially horizontal configuration,
- a worktable which is arranged above the rails and is provided with through openings which are contoured so that they can be crossed downward from above by said grip assembly during the rotary motion of the latter from said first raised configuration to said second substantially horizontal configuration, when said truck is in a predefined position proximate to said worktable, said grip assembly being able to slide away below the worktable after leaving the sheet on said table.

BRIEF DESCRIPTION OF THE DRAWINGS

Further characteristics and advantages of the invention will become better apparent from the following detailed description of a preferred but not exclusive embodiment thereof, illustrated by way of non-limiting example in the accompanying drawings, wherein.

DESCRIPTION OF THE PREFERRED EMBODIMENTS

Figure 1:
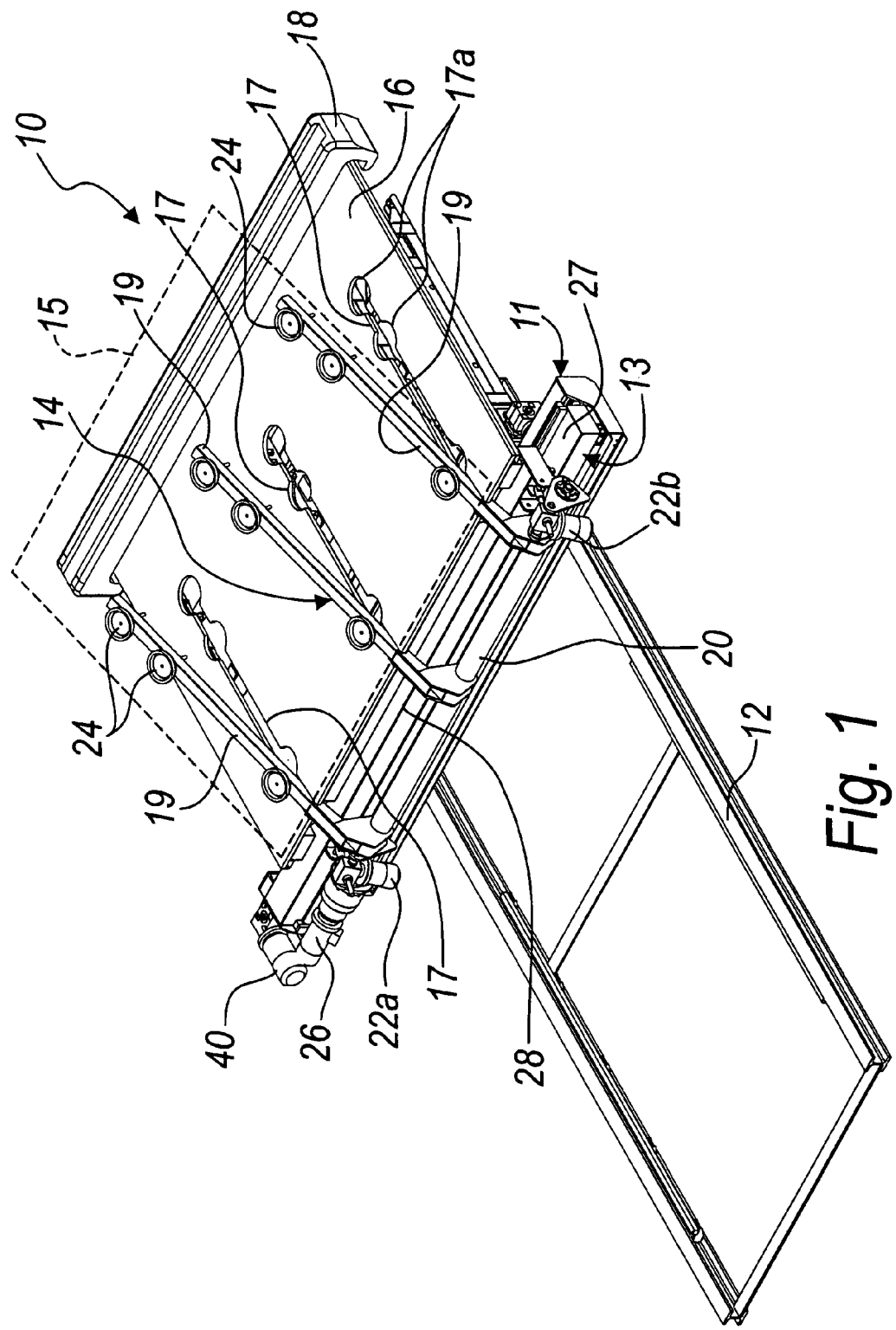
FIG. 1 is a perspective view of an apparatus according to the invention.

With reference to the figures, an apparatus for handling sheet-like products according to the invention is generally designated by the reference numeral 10.

The apparatus 10 comprises a truck 11 which can glide on rails 12; said rails 12 run laterally parallel to a row of inclined sheet supporting frames or between two rows of mutually opposite frames, which are not shown for the sake of simplicity.

The truck 11 is motorized and supports a supporting structure 13 for a grip assembly 14 for a sheet 15; the supporting structure 13 in turn can perform a translational motion on the truck 11 by way of means, described in greater detail hereinafter, for translational motion in a lateral direction with respect to the advancement direction of the truck 11.

The grip assembly 14 is rotatably coupled to its supporting structure 13 by way of rotation means, also described hereinafter, which are adapted to move it from a first raised grip configuration to a second substantially horizontal configuration when the sheet 15 is left on a worktable 16.

The apparatus 10 also comprises the worktable 16, which is arranged above the rails 12, for example at one end of the path traced by the rails 12.

Through openings 17 are provided on the worktable 16, which is provided for example with a cutting device 18, and are contoured so that they can be crossed downward from above by the grip assembly 14 during the rotary motion of the latter from the first raised grip configuration to the second substantially horizontal configuration.

The movement for the descent of the grip assembly 14 onto the worktable 16 can be performed when the truck 11 is in a predefined position proximate to the worktable 16.

In the embodiment of the invention described here by way of non-limiting example of the invention, the grip assembly 14 is provided by a series of uprights 19, which in this particular example are three, each of which supports a series of suckers 24 for gripping the sheet 15, according to the per se known art.

The uprights 19 are fixed by their lower part to a first tubular element 20, which belongs to said rotation means.

Such rotation means comprise, in association with the first tubular element 20, two jacks 22a and 22b, which move the first tubular element 20 with respect to a second tubular element 21, which is arranged inside the first element 20 and is coaxial thereto; the two jacks 22a and 22b are arranged at the ends of the first tubular element 20, as can be seen in FIG. 1.

The jacks 22a and 22b turn the first tubular element 20, to which the uprights 19 are rigidly coupled, with respect to the second tubular element 21, in order to provide the calibrated tilting motion of the uprights 19 which is required to bring the suckers 24 into contact with the sheet to be taken from the inclined frame, and for the subsequent opposite motion for the separation of the sheet from the underlying one.

The rotation of the grip assembly 14 from a first raised configuration to a second substantially horizontal configuration and vice versa is provided by means of an electric motor 26, which actuates a shaft 25 which crosses coaxially the second tubular element 21; said tubular element is keyed to the motor shaft 25 and receives from it the rotary motion with respect to the supporting structure 13, to which both belong.

The supporting structure 13 is constituted by two sliders: a first lower slider 27, which performs a lateral translational motion with respect to the truck 11, and a second upper slider 28, which performs a lateral translational motion on the first slider 27.

The translational motion means are provided, in this non-limiting exemplary embodiment of the invention, by a first rack-and-pinion device 29 for the translational motion of the first slider 27 on the truck 11 and by a similar second rack-and-pinion device 30 for the translational motion of the second slider 28 on the first slider 27.

The first pinion 29a is actuated by an electric motor, of a known type and is rigidly coupled to the truck 11, while the second pinion 30a is actuated by a further electric motor 40 which is rigidly coupled to the second slider 28.

The first slider 27 slides on the truck 11 by resting on two guides, a first lower guide 31 and a second rear guide 32.

Likewise, the second slider 28 glides on the underlying first slider 27 by means of two other guides, a third lower guide 33 and a fourth rear guide 34.

The first slider 27, like the second slider 28, are provided with means for preventing forward or backward tipping of the grip assembly 14 with respect to the advancement direction of the truck 11 on the rails 12.

For the first slider 27, said tipping prevention means are provided on one side by the second guide 32 and on the opposite side by pairs of rollers 35 which are pivoted to a bracket which is rigidly coupled to the first slider 27 and are arranged so as to rotate above and below the upper horizontal wing 36a of a profiled element 36 which is rigidly coupled to the truck 11.

For the second slider 28, the tipping prevention means are provided likewise on one side by the fourth guide 34 and on the opposite side by additional pairs of rollers 37 which are pivoted to a bracket which is rigidly coupled to the second slider 28 and are arranged so as to rotate above and below a flat protrusion 38 which is rigidly coupled to the first slider 27.

The worktable 16, in order to allow the passage of the uprights 19, is provided with through openings 17 which are indeed contoured so as to allow the passage of the uprights 19, with wider portions 17a for the passage of the suckers 24.

Figure 2:
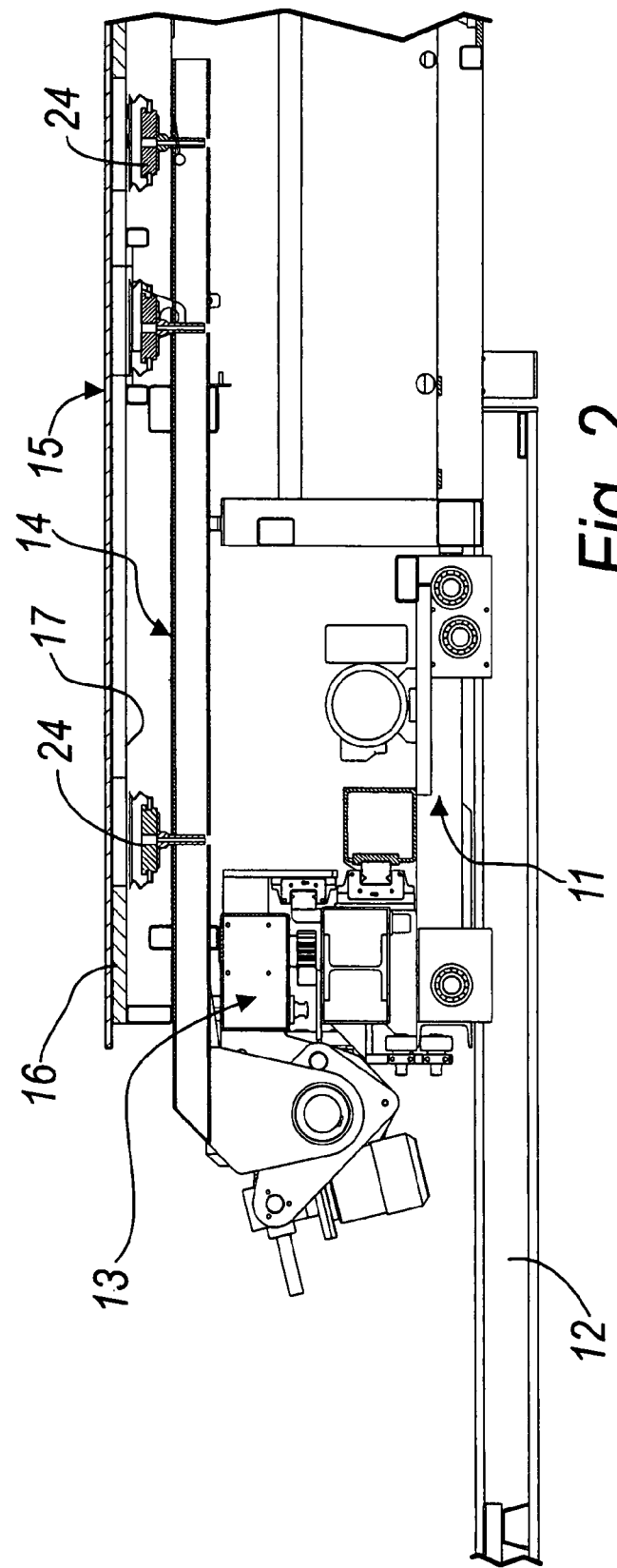
FIG. 2 is a sectional side view of an apparatus according to the invention.
Figure 3:
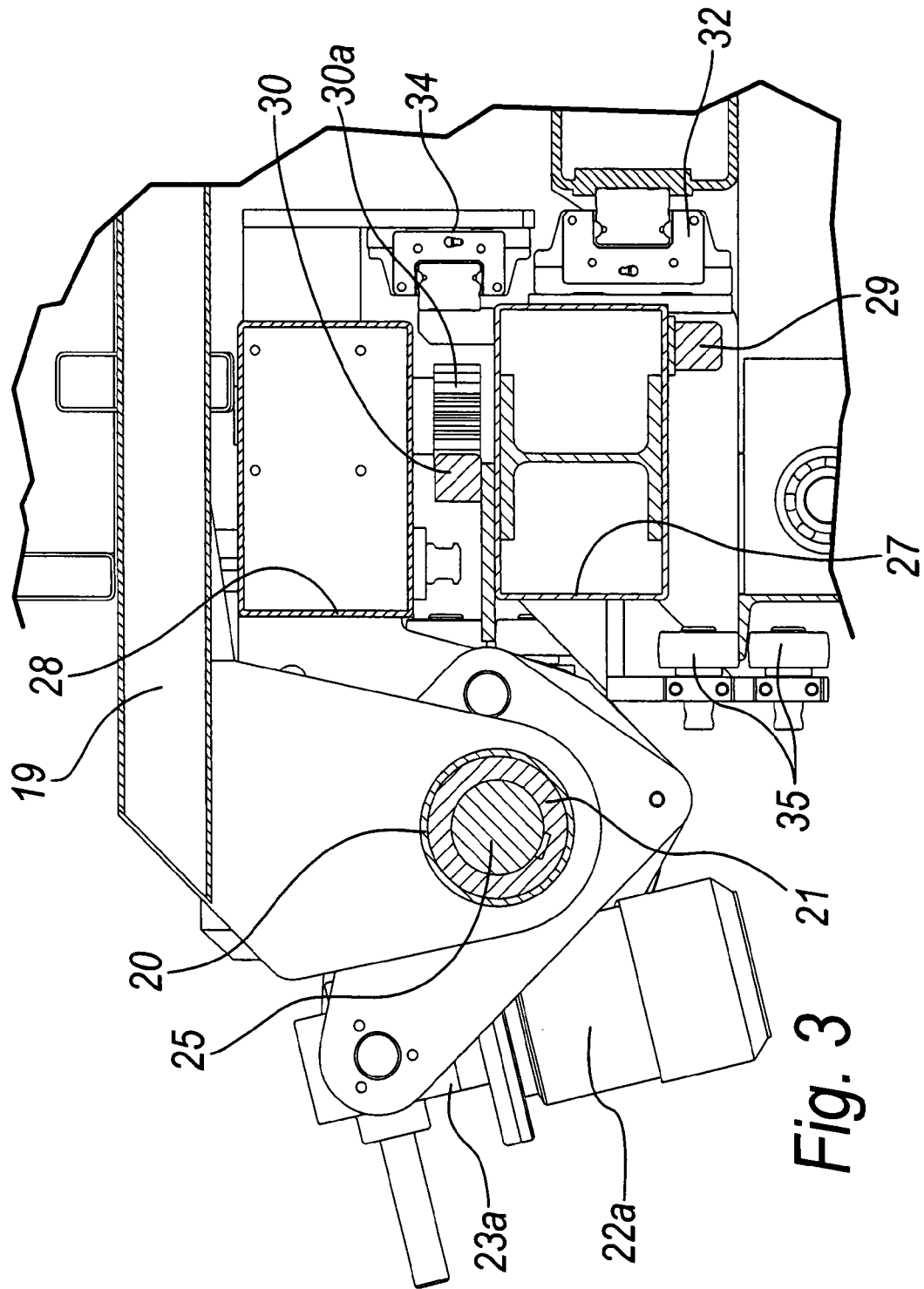
FIG. 3 is a partially sectional side view of a detail of the apparatus.
Figure 4:
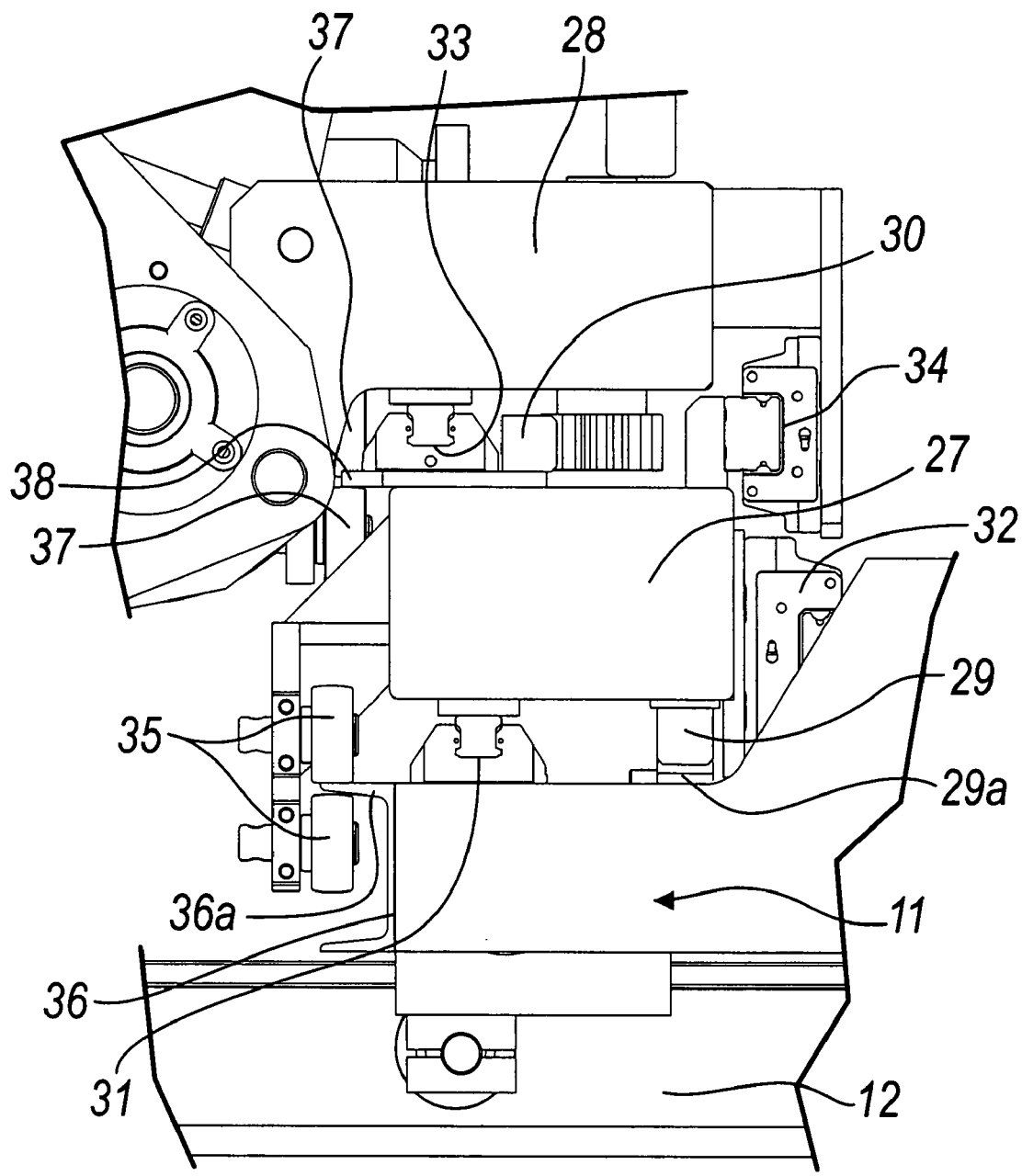
FIG. 4 is a side view of another detail of the structure.

In FIG. 1, the grip assembly 14 with the sheet 15 is shown in an intermediate position of its descending motion for depositing the sheet 15 onto the worktable 16, while the sectional side view of FIG. 2 shows that in the exemplifying embodiment of the invention described here the grip assembly 14, in a substantially horizontal configuration, is arranged below the worktable 16 so that the suckers 24 also lie completely below the worktable 16; the height from the ground of the lower face of the worktable 16 is therefore greater than the height from the ground of the suckers 24 in the horizontal configuration; this allows the truck 11 to slide out of the region affected by the worktable 16 while the sheet 15 is being worked, for example by means of a bridge-type cutting device 18 shown by way of example in FIG. 1.

The grip assembly 14 is therefore free to be moved so as to perform a new grip operation while at the same time work is being performed on the worktable 16; in this manner, the production rates of the apparatus 10 are relatively higher than those of a solution in which the grip assembly 14, in order to move, must wait for the end of the working of the sheet on the worktable 16 to move away from it.

The apparatus 10 according to the invention therefore does not provide a conveyance bed and is therefore compact and conveniently installable even in relatively small storage facilities and glassworks, such as those available to a small handicraft business.

The apparatus 10 according to the invention, without the liftable conveyance bed and with a worktable which cannot be lifted, is as a whole cheaper than known apparatuses provided with said elements.

In practice it has been found that the invention thus described solves the problems observed in known types of sheet handling apparatus.

In particular, the present invention provides an apparatus which is structurally simpler and therefore cheaper both in terms of material and in terms of labor for assembly and installation with respect to known types of apparatus and machinery.

Moreover, the present invention provides an apparatus which is less bulky than known ones and can also be installed in small storage facilities and glassworks.

Further, the apparatus according to the invention, without the liftable conveyance bed, allows the grip assembly to be available for a new grip operation in a shorter time than allowed by known types of apparatus.

Advantageously, the apparatus according to the invention can be associated easily with flat frame storage systems of the known type and with lines for working sheet-like products which are known and already active.

Moreover, the present invention provides an apparatus which is equipped with all the tipping prevention systems that are typical of known apparatuses and therefore is at least as safe as known apparatuses.

Moreover, the present invention provides an apparatus for handling sheet-like products accommodated in a storage facility which can be manufactured cheaply with known systems and technologies.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to requirements and to the state of the art.

The disclosures in Italian Patent Application No. PD2006A000363 from which this application claims priority are incorporated herein by reference.

What is claimed is:

1. An apparatus for handling sheet products, comprising:
   gliding rails;
   a truck that is glidable on said rails;
   a grip assembly for gripping a sheet;
   a supporting structure for supporting said grip assembly, said supporting structure having lateral translational motion means so as to be able to perform a translational motion on said truck with respect to a direction of advancement of the truck, said grip assembly being rotatably coupled to said supporting structure by way of rotation means thereof which are adapted to move the supporting structure from a first raised grip configuration to a second horizontal configuration;
   a worktable which is arranged above said rails and is provided with through openings which are contoured so as to be crossable downward from above and vice versa by said grip assembly during rotary motion of the grip assembly from said first raised configuration to said second horizontal configuration, when said truck is in a predefined position proximate to said worktable, said grip assembly being able to slide away below the worktable after leaving a sheet thereon, wherein said supporting structure is constituted by at least one slider, which is adapted to perform a lateral translational motion on said truck by way of said lateral translational motion means and wherein said supporting structure comprises two sliders, a first lower slider, which performs a lateral translational motion with respect to the truck, and a second upper slider, which performs a lateral translational motion on the first slider.

2. The apparatus of claim 1, wherein said grip assembly comprises a series of uprights, each of which supports a series of suckers for gripping a sheet.

3. The apparatus of claim 2, wherein said worktable is provided with said through openings which are contoured to allow passage of said uprights and have wider regions that allow passage of said suckers.

4. The apparatus of claim 3, wherein said grip assembly, while is in a horizontal configuration, is arranged below said worktable so that said suckers also lie completely below said worktable, a height from the resting ground of a lower face of said worktable being greater than a height from the resting ground of said suckers in a horizontal configuration, so that said grip assembly is able to slide out below said worktable in this condition.

5. The apparatus of claim 2, wherein said rotation means of the grip assembly comprise a first tubular element, to which said uprights are fixed at a lower part thereof, said rotation means further comprising a pair of jacks provided in association with said first tubular element and which move said first tubular element with respect to a second tubular element, said second tubular element being arranged inside the first tubular element coaxial thereto, said jacks being adapted to turn the first tubular element with respect to the second tubular element in order to provide a calibrated movement for a tilting of said uprights which is required to bring said suckers into contact with a sheet to be taken from an inclined frame and for a subsequent opposite motion for separation of the sheet from an underlying one.

6. The apparatus of claim 5, wherein said rotation means comprise an electric motor, a shaft driven by said motor and which crosses coaxially said second tubular element, the second tubular element being keyed on said motor shaft and receiving therefrom rotary motion with respect to said supporting structure to which the motor shaft and second tubular element both belong, said electric motor being adapted to turn the grip assembly from a first raised configuration to a second horizontal configuration and vice versa.

7. The apparatus of claim 1, wherein said supporting structure comprises two sliders, a first lower slider, which performs a lateral translational motion with respect to the truck, and a second upper slider, which performs a lateral translational motion on the first slider.

8. The apparatus of claim 1, wherein said translational motion means are provided by a first device having a rack and a pinion for translational motion of the first slider on the truck and by a second device having a rack and a pinion for translational motion of the second slider on the first slider, said first pinion being actuated by an electric motor which is rigidly coupled to the truck, said second pinion being actuated by a further electric motor which is rigidly coupled to the second slider.

9. The apparatus of claim 1, wherein the first slider glides on said truck by resting on two guides, a first lower guide and a second rear guide, said second slider gliding on the first lower slider by way of two further guides, a third lower guide and a fourth rear guide.

10. The apparatus of claim 9, wherein said first slider and said second slider are provided with tipping prevention means for preventing forward and backward tipping of the grip assembly with respect to a travel direction of the truck on said rails.

11. The apparatus of claim 10, wherein said tipping prevention means for the first slider are constituted on one side by said second guide and on another, opposite side by pairs of rollers, which are pivoted to a bracket which is rigidly coupled to said first slider and are arranged so as to rotate above and below an upper horizontal wing of a profiled element which is rigidly coupled to the truck.

12. The apparatus of claim 11, wherein said tipping prevention means for the second slider are provided on one side by said fourth guide and on the opposite side by additional pairs of rollers which are pivoted to a bracket which is rigidly coupled to said second slider and are arranged so as to rotate above and below a flat protrusion which is rigidly coupled to the first slider.

13. An apparatus for handling sheet products, comprising:
gliding rails;
a truck tat is glidable on said rails;
a grip assembly for gripping a sheet;
a supporting structure for supporting said grip assembly, said supporting structure having lateral translational motion means so as to be able to perform a translational motion on said truck with respect to a direction of advancement of the truck, said grip assembly being rotatably coupled to said supporting structure by way of rotation means thereof which are adapted to move the supporting structure from a first raised grip configuration to a second horizontal configuration;
a worktable which is arranged above said rails and is provided with through openings which are contoured so as to be crossable downward from above and vice versa by said grip assembly during rotary motion of the grip assembly from said first raised configuration to said second horizontal configuration, when said truck is in a predefined position proximate to said worktable, said grip assembly being able to slide away below the worktable after leaving a sheet thereon, wherein said grip assembly comprises a series of uprights, each of which supports a series of suckers for gripping a sheet, and wherein said rotation means of the grip assembly comprise a first tubular element, to which said uprights are fixed at a lower part thereof, said rotation means further comprising a pair of jacks provided in association with said first tubular element and which move said first tubular element with respect to a second tubular element, said second tubular element being arranged inside the first tubular element coaxial thereto, said jacks being adapted to turn the first tubular element with respect to the second tubular element in order to provide a calibrated movement for a tilting of said uprights which is required to bring said suckers into contact with a sheet to be taken from an inclined frame and for a subsequent opposite motion for separation of the sheet from an underlying one.

14. The apparatus of claim 13, wherein said worktable is provided with said through openings which are contoured to allow passage of said uprights and have wider regions that allow passage of said suckers.

15. The apparatus of claim 14, wherein said grip assembly, while is in a horizontal configuration, is arranged below said worktable so that said suckers also lie completely below said worktable, a height from the resting ground of a lower face of said worktable being greater than a height from the resting ground of said suckers in a horizontal configuration, so that said grip assembly is able to slide out below said worktable in this condition.

16. The apparatus of claim 13, wherein said rotation means comprise an electric motor, a shaft driven by said motor and which crosses coaxially said second tubular element, the second tubular element being keyed on said motor shaft and receiving therefrom rotary motion with respect to said supporting structure to which the motor shaft and second tubular element both belong, said electric motor being adapted to turn the grip assembly from a first raised configuration to a second horizontal configuration and vice versa.

17. The apparatus of claim 13, wherein said supporting structure is constituted by at least one slider, which is adapted to perform a lateral translational motion on said truck by way of said lateral translational motion means.

18. The apparatus of claim 17, wherein said supporting structure comprises two sliders, a first lower slider, which performs a lateral translational motion with respect to the truck, and a second upper slider, which performs a lateral translational motion on the first slider.

19. The apparatus of claim 18, wherein said translational motion means are provided by a first device having a rack and a pinion for translational motion of the first slider on the truck and by a second device having a rack and a pinion for translational motion of the second slider on the first slider, said first pinion being actuated by an electric motor which is rigidly coupled to the truck, said second pinion being actuated by a further electric motor which is rigidly coupled to the second slider.

20. The apparatus of claim 18, wherein the first slider glides on said truck by resting on two guides, a first lower guide and a second rear guide, said second slider gliding on the first lower slider by way of two further guides, a third lower guide and a fourth rear guide.

21. The apparatus of claim 20, wherein said first slider and said second slider are provided with tipping prevention means for preventing forward and backward tipping of the grip assembly with respect to a travel direction of the truck on said rails.

22. The apparatus of claim 21, wherein said tipping prevention means for the first slider are constituted on one side by said second guide and on another, opposite side by pairs of rollers, which are pivoted to a bracket which is rigidly coupled to said first slider and are arranged so as to rotate above and below an upper horizontal wing of a profiled element which is rigidly coupled to the truck.

23. The apparatus of claim 21, wherein said tipping prevention means for the second slider are provided on one side by said fourth guide and on the opposite side by additional pairs of rollers which are pivoted to a bracket which is rigidly coupled to said second slider and are arranged so as to rotate above and below a flat protrusion which is rigidly coupled to the first slider.

* * * * *